No. 781,231. PATENTED JAN. 31, 1905.
L. SAINBERG.
LETTER FILE.
APPLICATION FILED APR. 26, 1904.
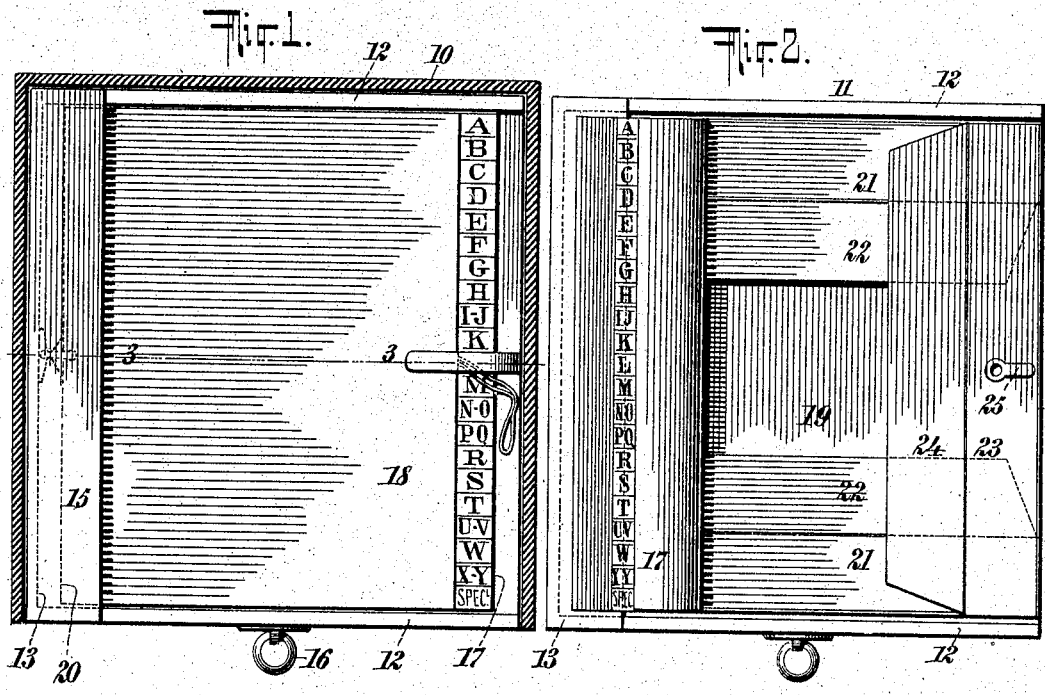
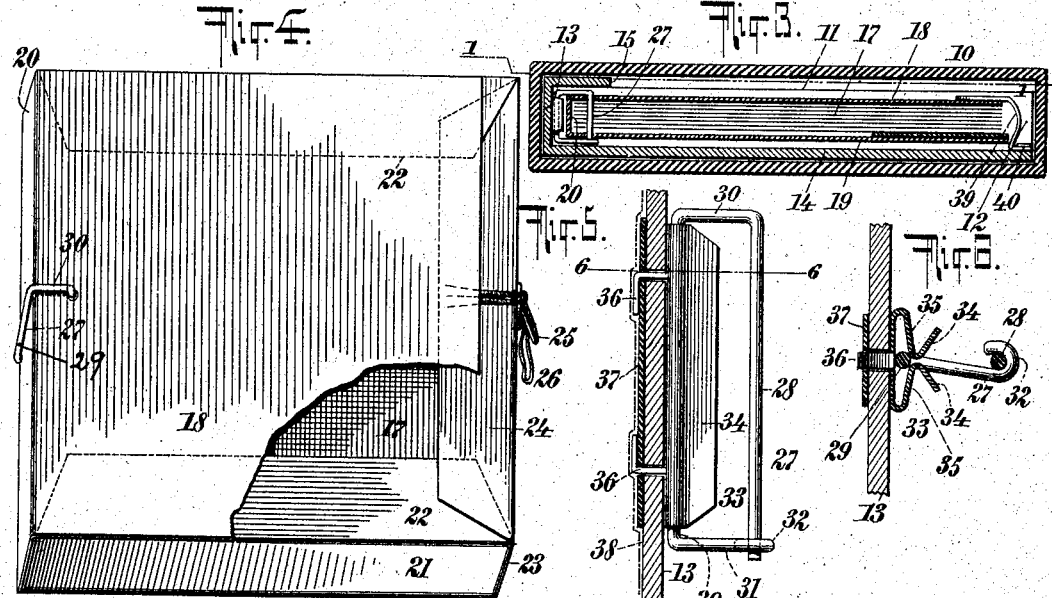
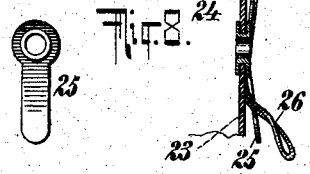
WITNESSES: Gustav Dietrich. Edwin H. Dietrich.
INVENTOR
Louis Sainberg
BY Chas. E. Gill
ATTORNEY No. 781,231. Patented January 31, 1905.

UNITED STATES PATENT OFFICE.

LOUIS SAINBERG, OF BROOKLYN, NEW YORK.

LETTER-FILE.

SPECIFICATION forming part of Letters Patent No. 781,231, dated January 31, 1905.

Application filed April 26, 1904. Serial No. 204,929.

*To all whom it may concern:*

Be it known that I, LOUIS SAINBERG, a citizen of Russia, and a resident of Brooklyn, in the county of Kings and State of New York, have invented certain new and useful Improvements in Letter-Files, of which the following is a specification.

The invention relates to improvements in files for letters and the like; and it consists in the novel features hereinafter described and claimed.

The purpose of my invention is to provide a letter-file which is convenient of use and the indexed or lettered leaves of which may when filled be withdrawn and wrapped within a stiff covering carried by the leaves and filed away, leaving the filing-case and its parts to receive another set of the leaves and be used over again as often as may be desired.

The file comprises an exterior box which is open at one end, a filing-casing proper to be slid into said box and withdrawn therefrom for use, a bank of indexed or lettered leaves to receive between them the papers to be filed, and a stiff wrapping carried by said bank of leaves and which may be wrapped about the same when said leaves become filled and are to be stored away, said bank of leaves and said wrapping being provided with means for detachably securing them within said filing-casing.

The invention will be fully understood from the detailed description hereinafter presented, reference being had to the accompanying drawings, in which—

Figure 1 is a top view, partly in section, of a letter-file constructed in accordance with and embodying the invention, the section being on the line 1 1 of Fig. 3 through the exterior inclosing box, leaving the file proper shown complete in top elevation. Fig. 2 is a top view of the file withdrawn from its box, the leaves of the file being curled upwardly and outwardly to the left to expose the lower flexible backing and wrapping sheet provided with flaps to be closed around the indexed leaves after the latter have become filled and it is desired to withdraw and store away the same. Fig. 3 is a vertical section of the file and its box on the dotted line 3 3 of Fig. 1. Fig. 4 is a perspective view, partly broken away, of the bank of indexed leaves withdrawn from the case portion of the file and inclosed by the wrapping connected with the leaves. Fig. 5 is an enlarged vertical section corresponding with the left-hand portion of Fig. 3 of the means for holding the bank of indexed leaves together and detachably securing them to the inner casing of the file. Fig. 6 is a sectional view of same on the dotted line 6 6 of Fig. 5. Fig. 7 is an enlarged detached view of a tongue connected with the wrapping-sheet for the indexed leaves and to coöperate with a string for fastening said wrapping around said leaves, as represented in Fig. 4; and Fig. 8 is a detached vertical section through a portion of the wrapping for the indexed leaves and illustrating the method of utilizing the tongue shown in Fig. 7.

In the drawings, 10 designates the exterior box or casing to inclose the file proper, which is numbered 11 and comprises a casing having sides 12, left-hand end 13, a bottom 14, and a lip 15, extending inwardly a short distance from the left-hand end 13, the main portion of the top and the right-hand end of the file-casing being left open and exposed. The box is simply a plain pasteboard box into which the file 11 is inserted and which conveniently holds the same when the file is not in actual use. The box 10 is inclosed except at one end, this being the lower end looking at Fig. 1, and the said box simply conveniently and snugly receives the file 11, the latter being provided with a ring 16 for its convenient withdrawal from said box.

The casing of the file 11 detachably receives the bank of indexed or lettered leaves 17, which leaves are of usual form, but in the present instance are inclosed within a heavy stiff paper wrapping composed of a top sheet 18, a bottom sheet 19, and a left-hand end section 20, which corresponds with the back of a book and connects in a hinged manner the top sheet 18 and bottom sheet 19. The bottom sheet 19 is provided at three of its edges with scored or creased flaps adapted to lie flat below the bank of leaves 17 during the use and gradual filling of the file with letters and then to be folded around the three edges of the bank of leaves 17 in the manner shown in Fig. 4 after said leaves have become filled and it is desired to store them away. The upper and lower flaps, looking at Fig. 2, of the sheet 19 comprise the sections 21 22, and the outer edge flap comprises the sections 23 24, all of which sections may lie flat upon the sheet 19 and below the bank of leaves 17, as represented in Figs. 2 and 3. The section 23 is provided with a metal tongue 25 of known construction, and the top sheet 18 is provided with a cord 26 to be passed under and held by the tongue 25 when the wrapping for the leaves 17 is to be brought into use, as shown in Figs. 4 and 8. The leaves 17, with their wrapping-sheets 18 19, are held together by a wire loop 27, (shown more fully in Fig. 5,) comprising a vertical member 28, which passes through apertures in the said leaves and sheets, a vertical member 29, which extends downwardly along the outer left-hand edge of said bank of leaves and sheets, as shown in Fig. 3, and the upper and lower horizontal members 30 31, the latter of which is provided with a hook end 32 to detachably receive the lower end of the inner vertical member 28, as represented in Figs. 5 and 6. The frame 27 connects the bank of leaves 17 and their wrapping-sheets together and permits of said leaves and sheets having a proper flexible movement and also enables the leaves 17 to move vertically and adjust themselves to the varying thickness of letters which may be introduced between them. The frame 27 also affords a convenient means for detachably connecting the bank of leaves 17 and their wrapping-sheets with the casing of the file 11, and in the present instance at the left-hand portion of the said casing is provided a vertically-arranged sheet-metal clip 33, into which the vertical member 29 of the book-frame 27 may be pushed when applying the leaves 17 into said casing, and the sides of which clip will detachably hold said member 29 so as to lock the leaves within said casing but permit their withdrawal with the frame 27 when it is desired to file said leaves away and substitute another bank of the leaves within said casing. The clip 33 will be formed of thin sheet metal capable of spring action and folded at its vertical edge portions to form the inclined lips 34 and holding-sections 35, as shown in Fig. 6, the said lips 34 serving to direct the member 29 to its proper position between the back of the clip and the adjoining portions of said sections 35. The clip 33 may be fastened to the end portion 13 of the casing of the file 11 by means of tongues 36, formed from the metal of the clip and projecting through apertures in said portion 13, as shown in Fig. 5, said tongues also preferably extending through a strip of tin 37 placed against the exterior surfaces of said portion 13, so that after the tongues have been bent over at their outer ends they may not during the application and removal of the banks of leaves 17 injure the said portion 13. The strip of metal 37 and the ends of the tongues 36 will preferably be covered over by pasting a strip of paper 38 over the same. The clip 33 remains as a part of the casing of the file 11, and its purpose is simply to detachably take the member 29 of the frame 27 for locking the bank of leaves 17 within said casing.

I also provide the bottom 14 of the file-casing with a sheet-metal arm 39, which is loosely held upon a pivot-pin 40 and may be turned over the outer edges of the bank of leaves 17, as shown in Figs. 1 and 3, or swiveled outwardly therefrom in a horizontal direction, so as to permit the turning upwardly of said leaves, the said arm 39 being provided for holding the leaves 17 and the letters placed between them in a compact condition when the file is not being used.

What I claim as my invention, and desire to secure by Letters Patent, is—

1. The file comprising the file-casing, the bank of indexed leaves 17 therein, and the heavy stiff wrapping for said bank of leaves and composed of the sheet-section 18 permanently covering one face of said bank, the opposite sheet-section 19 permanently disposed against the other face of said bank, and the left-hand end connecting section 20 permanently at the back edge of said bank and joining said sections 18, 19 on well-defined lines, said sheet-section 19 having at its upper and lower edges the creased flap-sections 21, 22 and at its outer edge the creased flap-sections 23, 24, and said flap-sections being adapted to be folded around the upper and lower and outer edges of said bank and to form with the section 20 and sheet-sections 18, 19 a rectangular box-like inclosure for the bank of leaves and their contained papers, combined with means securing said bank of leaves and said wrapping together, at the left-hand edge of the bank, in book form; substantially as set forth.

2. The file comprising the file-casing, the bank of indexed leaves 17 therein, and the heavy stiff wrapping for said bank of leaves and composed of the sheet-section 18 permanently covering one face of said bank, the opposite sheet-section 19 permanently disposed against the other face of said bank, and the left-hand end connecting section 20 permanently at the back edge of said bank and joining said sections 18, 19 on well-defined lines, said sheet-section 19 having at its upper and lower edges the creased flap-sections 21, 22 and at its outer edge the creased flap-sections 23, 24, and said flap-sections being adapted to be folded around the upper and lower and outer edges of said bank and to form with the section 20 and sheet-sections 18, 19 a rectangular box-like inclosure for the bank of leaves and their contained papers, combined with means connecting said leaves together in book form at their left-hand edges, said means also extending through said sheet-sections 18, 19 and maintaining them and the wrapping as a whole in position on said leaves; substantially as set forth.

3. The file comprising the file-casing, and the bank of indexed leaves therein, combined with the wire-loop frame 27 extending through said leaves and affording an exposed vertical member 29, and the vertical sheet-metal spring-clip 33 secured to said casing and adapted to detachably receive said member 29 for detachably locking said bank of leaves within said casing, said clip having the vertical inclined lips 34 and holding-sections 35; substantially as set forth.

4. The file comprising the file-casing, the bank of indexed leaves 17 therein, and the heavy stiff wrapping for said bank of leaves and composed of the sheet-section 18 permanently covering one face of said bank, the opposite sheet-section 19 permanently disposed against the other face of said bank, and the left-hand end connecting section 20 permanently at the back edge of said bank and joining said sections 18, 19 on well-defined lines, said sheet-section 19 having at its upper and lower edges the creased flap-sections 21, 22 and at its outer edge the creased flap-sections 23, 24, and said flap-sections being adapted to be folded around the upper and lower and outer edges of said bank and to form with the section 20 and sheet-sections 18, 19 a rectangular box-like inclosure for the bank of leaves and their contained papers, combined with the wire-loop frame 27 extending through said leaves and sheet-sections 18, 19 and affording an exposed member 29 at the outer side of said connecting-section 20, and a spring-clip secured to said casing and adapted to detachably receive said member 29 for detachably locking said leaves and their wrapping within said casing; substantially as set forth.

Signed at New York, in the county of New York and State of New York, this 25th day of April, A. D. 1904.

LOUIS SAINBERG.

Witnesses:
 CHAS. C. GILL,
 ARTHUR MARION